S. Richardson,
Water-Wheel Gate,
No. 262. A.I. Patented Jan. 17, 1860.
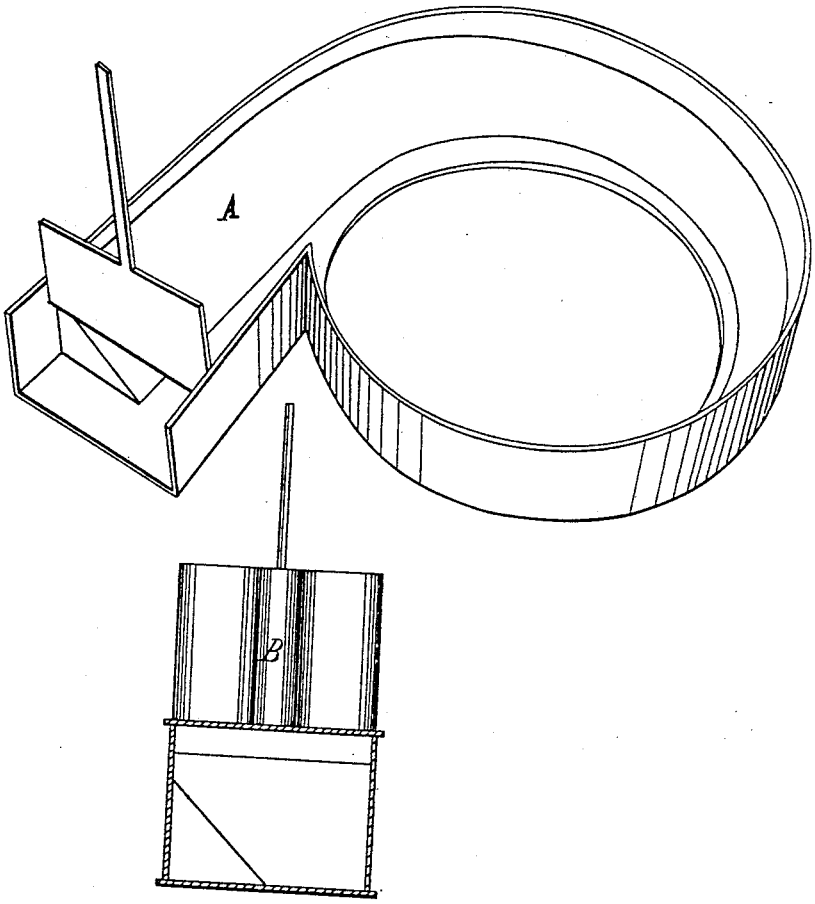
Witnesses:
E B. Williams
S. A. Williams
Inventor:
Sylvanus Richardson.
N. PETERS, PHOTO-LITHOGRAPHER, WASHINGTON, D. C.

UNITED STATES PATENT OFFICE.

SYLVANUS RICHARDSON, OF JERICHO, VERMONT.

IMPROVED WATER-WHEEL.

Specification of Additional Improvement No. 262, dated January 17, 1860, forming a part of Letters Patent No. 24,055, dated May 17, 1859.

*To all whom it may concern:*

Be it known that I, SYLVANUS RICHARDSON, of Jericho, county of Chittenden, and State of Vermont, have invented new Improvements on my Improved Water-Wheel patented May 17, 1859; and I do hereby declare that the following is a full and exact description thereof, reference being had to the accompanying drawings, and to the letters of reference marked thereon.

The nature of my invention consists in placing in the lower corner of the scroll-case of the water-wheel a tapering three-cornered piece of wood or iron, (marked A.)

Figure 1 is a perspective view of the scroll-case, the top off, showing the application of the three-cornered piece, which for a three-foot wheel should be six inches wide on the bottom and six inches high on the side from the wheel, and is made tapering the whole length, the largest end placed at the gate and the small end terminating with the scroll. The object of this three-cornered piece is, first, to enable a small quantity of water to take effect upon the buckets of the wheel much more effectually than it would without it, for when the gate is partially hoisted without this three-cornered piece the water will nearly pass around the wheel before the buckets or floats will feel its effect, for the reason that the water by its own momentum is thrown away from the wheel; secondly, by the application of the three-cornered piece, even with the gate raised to its full height, the water acts against the buckets or floats with greater force, and a decided additional power of the wheel is obtained thereby.

Fig. 2 is a front elevation of the mouth of the scroll-case, showing the gate hoisted, and also showing the gate bonnet or receptacle for the gate (marked B) upon the top of the case. This bonnet or receptacle for the gate is made hollow and is water-tight and firmly attached to the case a few inches back of the mouth of the scroll-case. This arrangement of the gate is very cheap and simple, and when attached to the case forms part of the scroll or chute and makes it complete, ready for the operation of the wheel when the mouth of the case is attached to the flume or water-box.

What I claim as my invention, and desire to secure by Letters Patent, is—

The application of the three-cornered piece within the scroll-case, constructed as described, for the purposes set forth.

SYLVANUS RICHARDSON.

Wituesses:

E. B. WILLIAMS,

S. A. WILLIAMS.